(12) United States Patent
Mehlis et al.

(10) Patent No.: US 10,605,343 B2
(45) Date of Patent: Mar. 31, 2020

(54) GEAR SYSTEM FOR AN ELECTRIC MOTOR OF A VEHICLE

(71) Applicant: Schaeffler Technologies AG & Co. KG, Herzogenaurach (DE)

(72) Inventors: Thomas Mehlis, Kleinsendelbach (DE); Andreas Kinigadner, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 248 days.

(21) Appl. No.: 15/541,535

(22) PCT Filed: Jan. 14, 2016

(86) PCT No.: PCT/DE2016/200014
§ 371 (c)(1),
(2) Date: Jul. 5, 2017

(87) PCT Pub. No.: WO2016/116104
PCT Pub. Date: Jul. 28, 2016

(65) Prior Publication Data
US 2018/0017148 A1    Jan. 18, 2018

(30) Foreign Application Priority Data

Jan. 20, 2015   (DE) .................. 10 2015 200 799

(51) Int. Cl.
*F16H 37/02*  (2006.01)
*F16H 3/083*  (2006.01)
*B60K 1/00*   (2006.01)

(52) U.S. Cl.
CPC ............. *F16H 37/021* (2013.01); *B60K 1/00* (2013.01); *F16H 37/022* (2013.01);
(Continued)

(58) Field of Classification Search
CPC ...... F16H 37/031; F16H 37/022; F16H 3/083; F16H 2200/0021
(Continued)

(56) References Cited

U.S. PATENT DOCUMENTS 4,548,100 A    10/1985  Hohn
4,553,450 A *  11/1985  Gizard ................ F16H 37/0846
                                                    475/212

(Continued)

FOREIGN PATENT DOCUMENTS

CN        2052848 U      2/1990
CN       101228370 A     7/2008
(Continued)

OTHER PUBLICATIONS

International Search Report of PCT/DE2016/200014 dated Nov. 5, 2015, 2 pages.

*Primary Examiner* — Ha Dinh Ho
(74) *Attorney, Agent, or Firm* — Davidson, Davidson & Kappel, LLC

(57) ABSTRACT

A gearing arrangement for an electric motor which is improved in terms of ease of use and efficiency. To this end there is proposed a gearing arrangement for an electric motor of a vehicle, including an input interface for coupling to the electric motor and including an output interface, such that a drive torque path runs between the input interface and the output interface; including a first transmission gearing stage with a first transmission ratio (i1), such that the drive torque path in a first gearshift state runs via the first transmission gearing stage; and including a second transmission gearing stage with a second transmission ratio, such that the drive torque path in a second gearshift state runs via the second transmission gearing stage; and including an intermediate transmission gearing stage with a continuously variable transmission ratio (i1 . . . i2), such that the drive
(Continued)

torque path in an intermediate gearshift state runs via the intermediate transmission gearing stage.

20 Claims, 3 Drawing Sheets

(52) U.S. Cl.
CPC ........ *B60K 2001/001* (2013.01); *F16H 3/083* (2013.01); *F16H 2200/0021* (2013.01)

(58) Field of Classification Search
USPC .......................................................... 74/745
See application file for complete search history.

(56) References Cited

U.S. PATENT DOCUMENTS

| | | | |
|---|---|---|---|
| 5,720,686 A | 2/1998 | Yan et al. | |
| 5,853,343 A | 12/1998 | Eggert et al. | |
| 7,311,629 B2* | 12/2007 | Vornehm | B60W 20/30 475/210 |
| 7,717,815 B2 | 5/2010 | Tenberge | |
| 8,562,464 B2* | 10/2013 | Yang | F16H 9/12 474/32 |
| 8,771,116 B2 | 7/2014 | Triller | |
| 8,818,665 B2* | 8/2014 | Kurata | F02D 29/02 701/55 |
| 2002/0068660 A1 | 6/2002 | Fritzer et al. | |
| 2007/0082781 A1* | 4/2007 | Eguchi | B60W 10/107 477/44 |
| 2012/0100957 A1 | 4/2012 | Reitz | |

FOREIGN PATENT DOCUMENTS

| | | |
|---|---|---|
| CN | 102076997 A | 5/2011 |
| DE | 818300 C | 10/1951 |
| DE | 1127133 B | 4/1962 |
| DE | 3118075 A1 | 11/1982 |
| DE | 4234629 A1 | 4/1993 |
| DE | 10139121 A1 | 3/2002 |
| DE | 10212790 A1 | 11/2003 |
| DE | 102010024147 A1 | 1/2011 |
| JP | S58193965 | 11/1983 |

* cited by examiner

GEAR SYSTEM FOR AN ELECTRIC MOTOR OF A VEHICLE

The present invention relates to a gear system for an electric motor of a vehicle, including an input interface for coupling to the electric motor, and an output interface, a torque path extending between the input interface and the output interface, and including a first transmission gear section having a first gear ratio, in a first shift state the torque path extending across the first transmission gear section, and including a second transmission gear section, in a second shift state the torque path extending across the second transmission gear section.

BACKGROUND

Electric vehicles are often operated nowadays using only one gear speed. As a result, however, it is not possible to operate the electric motor, which operates as a traction motor, in an optimal range for every speed. The use of two-speed transmissions for electric motors has proven to be a good compromise. However, electric vehicles face the same, or at least similar, technical challenges as internal combustion engines. Without further measures, an interruption in traction results when the gears are shifted, which is perceivable by occupants of the electric vehicle. To provide gear shifting that is as comfortable as possible, it is advantageous to shift without an interruption in traction.

The publication DE 10 2010 024 147 A1 relates to a two-speed transmission and a method for controlling the two-speed transmission. The problem of the interruption in traction is also discussed in this publication. In addition to the use of a dual clutch transmission, the combination of a controllable clutch device with a switchable clutch device is provided. Power shifting is thus achieved, in that the speed jump at the drive shaft takes place, continuously and under load, as a function of the gear step, the transition being implemented via slip in the controllable clutch device or in the switchable clutch device.

SUMMARY OF THE INVENTION

An object of the underlying the present invention is to provide a gear system for an electric motor that is improved with regard to comfort and efficiency.

Within the scope of the present invention, a gear system is provided that is suitable and/or designed for an electric motor. The electric motor optionally forms a part of the gear system according to the present invention. The gear system is in particular suitable and/or designed for a vehicle. The vehicle is preferably implemented as a passenger vehicle, a truck, a bus, or some other mobile vehicle. Optionally, the vehicle including the gear system and the electric motor constitutes a further subject matter of the present invention.

The gear system forms a gear section in the drive train of the vehicle, between the electric motor and the output wheels. In particular, a differential unit which distributes the drive torque of the electric motor to two wheels of a shared axle or to two axles of the vehicle may be connected downstream from the gear system. The differential unit optionally forms an integral part of the gear system.

The gear system includes an input interface that is designed for coupling to the electric motor. The input interface is particularly preferably rotatably fixedly connected to the electric motor, in particular rotatably fixedly connected to a rotor of the electric motor. In addition, the gear system includes an output interface which is designed in particular for coupling to the differential unit. A torque path for transmitting the drive torque from the electric motor via the input interface to the output interface extends between the input interface and the output interface. The torque path is at least switchable within the gear system. The torque path is optionally closed in every operating state of the gear system. The torque path may preferably be switched only between various variants of torque paths which are all closed between the input interface and the output interface.

The gear system includes a first transmission gear section having a first gear ratio. In particular, the first transmission gear section has a first fixed gear ratio. The first gear ratio is selected in particular to translate a higher speed at the input into a lower speed at the output. In particular, the first transmission gear section forms a step-down gear. In particular, the first transmission gear section represents a first gear of the gear system. It is provided that in a first shift state of the gear system, the torque path extends as a first torque path across the first transmission gear section.

The gear system also includes a second transmission gear section having a second gear ratio. In particular, the second transmission gear section has a second fixed gear ratio. The second transmission gear section is in particular also designed as a step-down gear. In particular, the second transmission gear section represents a second gear of the gear system. The first gear is to be selected for lower speeds, and the second gear, for higher speeds. In a second shift state of the gear system, the torque path extends as a second torque path across the second transmission gear section.

In particular it is provided that in the first shift state, the second transmission gear section having the second gear ratio is outside the first torque path, and in the second shift state, the first transmission gear section having the first gear ratio is outside the second torque path. The overall gear ratio of the gear system in the first shift state particularly preferably corresponds to the first gear ratio, and in the second shift state corresponds to the second gear ratio.

Within the scope of the present invention, it is provided that the gear system includes an intermediate gear section having a continuously variable gear ratio. It is provided that in an intermediate shift state of the gear system, the torque path extends as an intermediate torque path across the intermediate gear section. It is provided in particular that the intermediate torque path extends outside the first transmission gear section having the first gear ratio, and outside the second transmission gear section having the second gear ratio. It is particularly preferred that the overall gear ratio of the gear system is given by the instantaneous value of the continuously variable gear ratio of the intermediate gear section.

According to the present invention, it is thus provided that for a shiftable gear system that includes at least two or exactly two gears, an intermediate gear section is provided that has a continuously variable gear ratio. The intermediate gear section may be activated in an intermediate shift state between the first shift state and the second shift state so that, starting from the first gear ratio, the gear system may be led to the second gear ratio via the continuously variable gear ratio. Alternatively or additionally, the intermediate gear section may be activated into the intermediate shift state between the second shift state and the first shift state, so that, starting from the second gear ratio, the gear system may be led to the first gear ratio via the continuously variable gear ratio.

Due to the fact that the intermediate gear section may be operated and/or is operated under load when the gear ratio is changed, it is possible to design the overall shifting operation from the first shift state, via the intermediate shift state, into the second shift state, or in the opposite direction, with no interruption in traction or at least with little interruption in traction.

In particular, it is provided that a starting value of the continuously variable gear ratio corresponds to the first gear ratio, and an end value of the continuously variable gear ratio corresponds to the second gear ratio.

Due to the novel gear system, on the one hand the comfort during shifting is improved, since during the shifting operation the gear ratio is led in a continuously variable manner from the first gear ratio to the second gear ratio, or in the opposite direction. On the other hand, the efficiency is improved, since no slip or friction devices are provided that would convert kinetic energy, via friction, into thermal energy during the shifting operation. Lastly, stable operating behavior of the gear system is achieved due to the fact that fixed gear ratios are specified in the first shift state and in the second shift state, and only in the intermediate shift state, which is uncommon, is it necessary to resort to an intermediate gear section having a continuously variable gear ratio.

It is particularly preferably provided that the first and/or the second transmission gear section are/is designed as gear stage(s), in particular a spur gear stage. In the simplest specific embodiment, the gear stages may have a two-wheeled design. With regard to the intermediate gear section, which often uses a positive gear ratio, it is preferred that the gear stages each have an uneven number of wheels, in particular three wheels, in order to likewise achieve a positive gear ratio.

In one preferred implementation of the present invention, the intermediate gear section is designed as a continuously variable transmission (CVT) section. The intermediate gear section or the CVT section is particularly preferably implemented as a traction mechanism gear section. The traction mechanism may be designed, for example, as a steel thrust belt, as a V-belt, as a plate link chain, as a chain, etc. In particular, the traction mechanism gear section is designed as a variator which includes a pair of input cone pulleys, a pair of output cone pulleys, and the traction mechanism, the traction mechanism being situated operatively connected between the two pairs.

In one particularly preferred implementation, at least one of the input cone pulleys is designed as an axially displaceable input cone pulley, and/or at least one output cone pulley is designed as an axially displaceable output cone pulley. The basis of the mode of operation of the traction mechanism gear section, in particular the variator, is that by changing the axial distance between the input cone pulleys and at the same time changing the axial distance between the output cone pulleys, the traction mechanism for the input cone pulleys and for the output cone pulleys extends with a different effective pitch diameter, so that the gear ratio may be set as a continuously variable gear ratio by changing the axial distances.

It is preferably provided that the gear system includes a coupling device that is designed for displacing one of the input cone pulleys, as a displaceable input cone pulley, in at least one axial direction, preferably in both axial directions. In addition, the first transmission gear section includes a coupling input wheel or is operatively connected to same, whereby a coupling, in particular a rotatably fixed coupling, between the coupling input wheel and the displaceable input cone pulley takes place by the coupling device axially moving the displaceable input cone pulley. Due to the axial displacement of the displaceable input cone pulley, on the one hand the displaceable input cone pulley is coupled to the coupling input wheel, and on the other hand, the axial distance between the displaceable input cone pulley and the other input cone pulley, which is preferably designed as a stationary input cone pulley, is increased in the coupled state compared to the uncoupled state. If the pair of input cone pulleys is regarded as a wheel for the traction mechanism, increasing the axial distance decreases the pitch diameter of the wheel, also referred to as the effective pitch diameter.

Alternatively or additionally, the gear system includes a second coupling device for displacing one of the output cone pulleys, as a displaceable output cone pulley, in at least one or exactly one axial direction. In addition, the second transmission gear section includes a coupling output wheel or is operatively connected to same. A coupling between the coupling output wheel and the displaceable output cone pulley takes place via an axial displacement of the displaceable output cone pulley. When the output cone pulley is moved from the uncoupled state into the coupled state, the axial distance from the displaceable output cone pulley to the other, in particular stationary, output cone pulley is increased. A wheel for the traction mechanism or an effective pitch diameter is thus decreased during the transition from the uncoupled state into the coupled state.

In particular, the first coupling device, the displaceable input cone pulley, and the coupling input wheel form a first coupling system, and/or the second coupling device, the displaceable output cone pulley, and the coupling output wheel form a second coupling system. In the first shift state, the first coupling system is in the coupled state. In the second shift state, the second coupling system is in the coupled state.

During a transition from the first shift state into the second shift state, the first coupling system is initially in the coupled state. The torque path, as the first torque path, extends across the first transmission gear section.

When the first coupling system is transferred from the coupled state into the uncoupled state, the torque path, as an intermediate torque path, extends next to or in parallel to the first transmission gear section, next to or in parallel to the second transmission gear section, and across the intermediate gear section. In particular, the gear ratio of the gear system is determined by the value of the continuously variable gear ratio.

Due to the axial displacement of the displaceable input cone pulley, the effective pitch diameter of the traction mechanism is increased at the pair of input cone pulleys. The effective pitch diameter of the traction mechanism at the pair of output cone pulleys is necessarily reduced, at the same time the displaceable output cone pulley being axially pushed away from the other output cone pulley. The gear ratio is changed in a continuously variable manner by changing the effective pitch diameter. The gear system is coordinated in such a way that as soon as the gear ratio of the intermediate gear section, starting from the first gear ratio, has reached the second gear ratio, the second coupling system is transferred from the uncoupled state into the coupled state. Beginning at this shift point, the torque path extends as a second torque path across the second transmission gear section.

In one preferred embodiment of the present invention, the coupling input wheel and the displaceable input cone pulley in the coupled state are connected to one another in a form-locked manner about a shared rotation axis in a circumferential direction. The coupling input wheel and the displaceable input cone pulley are particularly preferably connected to one another in a form-locked manner in a circumferential direction via a claw clutch. This embodiment has the advantage that, even during operation with the first gear ratio and/or in the first gear, the torque path is provided solely in a form-locked manner, and no frictional areas are present. Alternatively or additionally, it is provided that the coupling output wheel and the displaceable output cone pulley in the coupled state are connected to one another in a form-locked manner about a shared rotation axis in a circumferential direction. With the same advantages, it is provided that the coupling output wheel and the displaceable output cone pulley together form a claw clutch.

In one possible embodiment of the present invention, the first coupling device and/or the second coupling device are/is designed as an active coupling device. In particular, the coupling device is operated by external power in order to move the input cone pulley and/or the output cone pulley in the axial direction. In one possible implementation of the present invention, the coupling device is designed as an electrical actuator. The coupling device, in particular the electrical actuator, particularly preferably has a self-locking design so that it may be kept in a de-energized, in particular currentless, state in the first shift state and in the second shift state of the gear system, and in this way fixes the particular shift state in an energy-saving manner.

In one preferred refinement of the present invention, the first coupling device is designed as an active coupling device, and the second coupling device is designed as a passive coupling device. In one possible embodiment of the present invention, the second coupling device is designed as a spring device, in particular a compression spring device, that is situated in such a way that the output cone pulley is pressed and/or pretensioned into the uncoupled state. This embodiment has the advantage that an active coupling device may be dispensed with, and at the same time the control may be simplified. During a switch from the first shift state into the second shift state, a pressure force is applied to the displaceable output cone pulley in the axial direction via the first coupling device and the intermediate gear section, so that the displaceable output cone pulley is moved into the coupled state. If the active first coupling device is moved during downshifting from the second shift state into the first shift state, due to the stored spring energy the output cone pulley is moved from the coupled state into the uncoupled state via the second coupling device as a passive coupling device. Lastly, an assessment must be made as to whether a higher level of driving comfort and/or shifting comfort is to be achieved by two active coupling devices, or whether it is preferable to implement a cost-effective, less complex design having an active coupling device and a passive coupling device.

In one possible refinement, the first coupling device is designed as the active coupling device, and the second coupling device is designed as the passive coupling device. In addition, the gear system includes a blocking device, in particular a parking device, the blocking device being formed by the displaceable input cone pulley and a stop that is fixed to the housing. The displaceable input cone pulley and the stop are designed for a frictionally locked and/or form-locked coupling. The blocking device is activated in that the first coupling device axially moves the displaceable input cone pulley beyond or past the position for coupling with the input coupling wheel, so that the first coupling device assumes a coupling position. The displaceable input cone pulley is moved far enough in the axial direction until it rests against the stop in a form-locked and/or frictionally locked manner, locks the gear system, and thus forms a lock, in particular a parking lock. In the coupling position, the first coupling device is particularly preferably in a self-retaining and/or self-locking position, so that the lock is retained even when the first coupling device is deactivated. In this embodiment, it is particularly advantageous that the first coupling device has an additional function, namely, takes over the actuation of the locking device, so that in addition, components for the gear system are spared, and therefore a space-saving and comfortable operation is possible.

In one preferred structural embodiment of the present invention, the gear system includes an input shaft and an output shaft, the input shaft being operatively connected, in particular rotatably fixedly connected, to the input interface, and the output shaft being operatively connected, in particular rotatably fixedly connected, to the output interface. The first transmission gear section includes a first fixed wheel on the output shaft and a first idler wheel on the input shaft, the first idler wheel being rotatably fixedly connected to the coupling input wheel or even having a one-piece design. The first coupling device is designed for coupling and decoupling the first idler wheel, in the function as a coupling input wheel, to/from the displaceable input cone pulley. The second transmission gear section includes a second fixed wheel on the input shaft and a second idler wheel on the output shaft. The second coupling device is designed for decoupling the displaceable output cone pulley from the second idler wheel as a coupling output wheel, and optionally for also coupling same.

In one possible refinement, the gear system includes an auxiliary gear section that is designed as a gear stage, for example. The auxiliary gear section is situated between the output interface and the differential unit, and is dimensioned in such a way that the differential unit is provided coaxially with respect to the input shaft. In this embodiment, it is preferred that the input shaft is designed as a hollow input shaft, one of the output shafts of the differential unit being passed through the hollow input shaft. It is particularly preferred that the output shaft is also coaxially guided with respect to the electric motor, so that the electric motor is situated coaxially with respect to the output shaft of the differential unit. This refinement allows the gear system to be integrated into the vehicle in a particularly compact manner.

BRIEF DESCRIPTION OF THE DRAWINGS

Another possible subject matter of the present invention relates to a vehicle that includes the gear system, and a method for shifting the gear system, preferably in the vehicle. Further features, advantages, and effects of the present invention result from the following description of one preferred exemplary embodiment of the present invention, and the appended figures.

DETAILED DESCRIPTION

Figure 1:
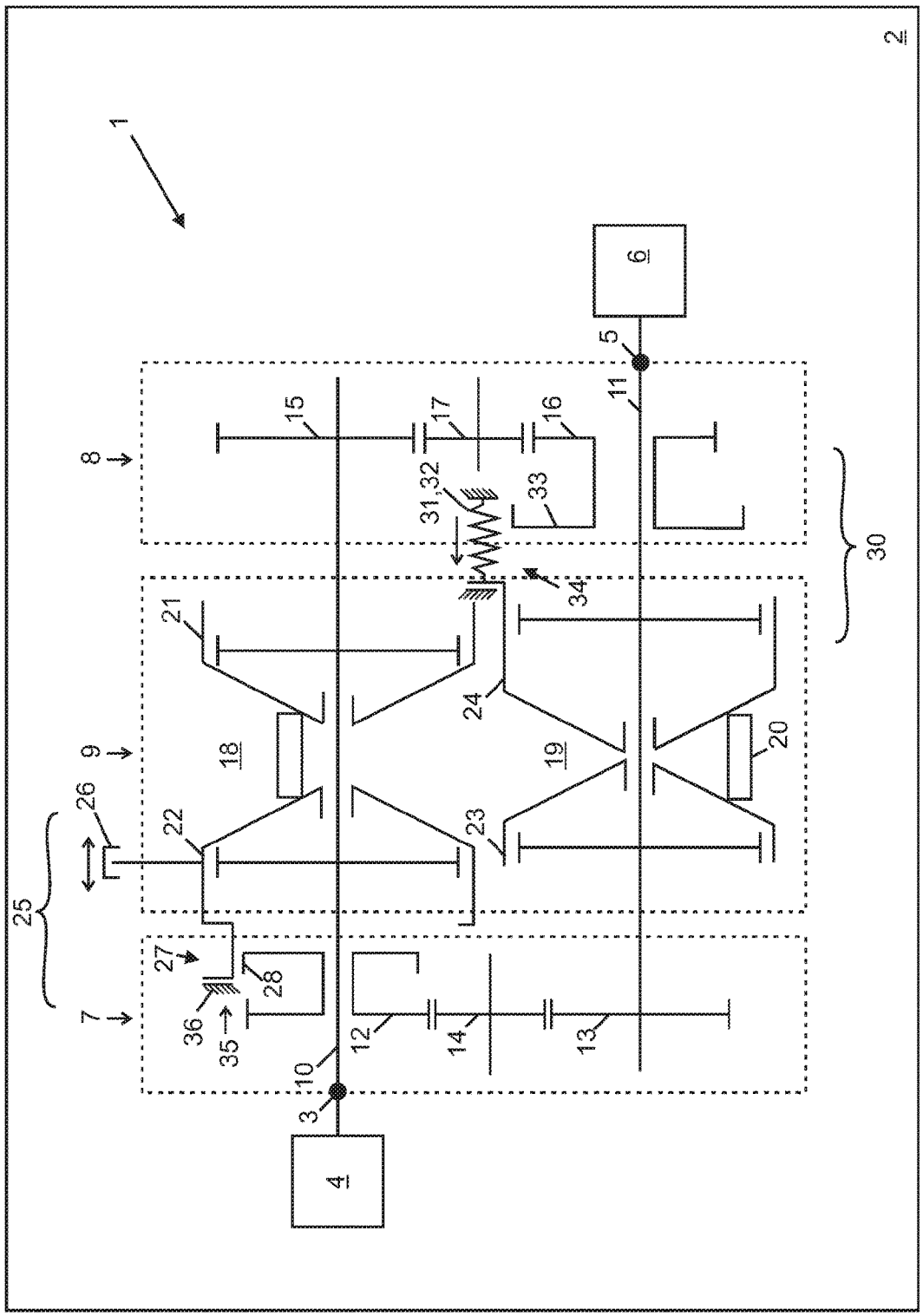
FIG. 1 shows a schematic illustration of a gear system as a first exemplary embodiment of the present invention, in a first shift state.

FIG. 1 shows a schematic illustration of a gear system 1 for a vehicle 2, vehicle 2 being depicted only schematically as a box. Gear system 1 forms a part of the drive train of vehicle 2.

Gear system 1 includes an input interface 3 that is rotatably fixedly coupled to an electric motor 4. Electric motor 4 is designed as a traction motor for vehicle 2, and on the one hand may constitute the sole traction motor for vehicle 2. Alternatively, vehicle 2 may be designed as a hybrid vehicle, which in addition to electric motor 4 includes yet another motor as a traction motor for the drive. It is also possible for vehicle 2, as an electric vehicle, to include one or multiple additional electric motors as traction motors.

Gear system 1 also includes an output interface 5 that is rotatably fixedly coupled to a differential unit 6. Differential unit 6 is used for selectively distributing the drive torque, which is generated by electric motor 4 and transmitted by gear system 1, to two wheels of a shared axle or to two axles of vehicle 2.

The gear system may be subdivided into a first transmission gear section 7, a second transmission gear section 8, and an intermediate gear section 9, which are activated and deactivated as a function of a shift state of gear system 1.

Gear system 1 includes an input shaft 10 and an output shaft 11. Input shaft 10 is rotatably fixedly coupled to input interface 3, and output shaft 11 is rotatably fixedly coupled to output interface 5.

First transmission gear section 7 includes a first idler wheel 12 that is rotatably situated on input shaft 10. In addition, first transmission gear section 7 includes a first fixed wheel 13 that is rotatably fixedly situated on output shaft 11. First idler wheel 12 and first fixed wheel 13 are operatively connected to one another via a first intermediate wheel 14. First idler wheel 12, first fixed wheel 13, and first intermediate wheel 14 are each designed as spur gears, in particular spur gearwheels, and together form a first gear stage having a first fixed gear ratio i1.

Second transmission gear section 8 includes a second fixed wheel 15 that is rotatably fixedly situated on input shaft 10, a second idler wheel 16 that is rotatably situated on output shaft 11, and a second intermediate wheel 17 that meshes with second fixed wheel 15 and with second idler wheel 16. Second fixed wheel 15, second idler wheel 16, and second intermediate wheel 17 together form a second gear stage having a fixed second gear ratio i2.

Intermediate transmission gear section 9 includes a pair of input cone pulleys 18 and a pair of output cone pulleys 19, as well as a traction mechanism 20. The pair of input cone pulleys 18 is coaxially and rotatably fixedly mounted on input shaft 10. The pair of output cone pulleys 19 is coaxially and rotatably fixedly mounted on output shaft 11. Traction mechanism 20 is designed as a wraparound means. The traction mechanism may be designed, for example, as a steel thrust belt, a V-belt, a plate link chain, or a chain.

The pair of input cone pulleys 18 includes a stationary input cone pulley 21 and a displaceable input cone pulley 22. The pair of output cone pulleys 19 includes a stationary output cone pulley 23, and an output cone pulley 24 that is displaceable in the axial direction. The pair of input cone pulleys 18 face one another, traction mechanism 20 being guided between input cone pulleys 21 and 22 on their mutually facing tapered surfaces. In addition, traction mechanism 20 extends between mutually facing output cone pulleys 23 and 24, traction mechanism 20 being guided on the tapered surfaces.

The pair of input cone pulleys 18, the pair of output cone pulleys 19, and traction mechanism 20 together form a variator gear having a continuously variable gear ratio, the continuously variable gear ratio covering at least the range between i1 and i2, so that the gear ratio range between i1 and i2 may be provided from intermediate gear section 9 in a continuously variable manner.

In the following description, the instantaneous radial position of traction mechanism 20 in the pair of input cone pulleys 18 is used as their effective pitch diameter, and the radial position of traction mechanism 20 in the pair of output cone pulleys 19 is used as their effective pitch diameter.

Gear system 1 includes a first coupling system 25 that is designed for detachably coupling axially displaceable input cone pulley 22 to first idler wheel 12. Coupling system 25 includes a first coupling device 26 that is designed as an active coupling device, and in the present case, as an electrical actuator which may actively move displaceable input cone pulley 22 in the axial direction, in particular in both axial directions. First coupling device 26 has a self-locking design, so that in the particular selected shift position it also remains in the de-energized state and thus saves energy. In addition, coupling system 25 includes a first clutch device 27 that detachably couples input cone pulley 22 to first idler wheel 12. First clutch device 27 includes a coupling input wheel 28 that is rotatably fixedly connected to first idler wheel 12. In this exemplary embodiment, coupling input wheel 28 and displaceable input cone pulley 22 each bear a claw part, and the two claw parts together form a claw clutch as first clutch device 27. The claw part may rest directly on idler wheel 12 instead of on coupling input wheel 28. First clutch device 27 is closed when first coupling device 26 axially moves displaceable input cone pulley 22 in the direction of first idler wheel 12, so that the claw part of displaceable input cone pulley 22 may engage with the claw part of coupling input wheel 28. First clutch device 27 is disengaged when displaceable input cone pulley 22 is moved away from first idler wheel 12 in the axial direction.

Gear system 1 includes a second coupling system 30 which allows a detachable coupling of displaceable output cone pulley 24 to second idler wheel 16. Second coupling system 30 includes a second coupling device 31 which, however, is designed as a passive coupling device. In particular, second coupling device 31 is designed as a compression spring device that includes a compression spring 32 that pushes displaceable output cone pulley 24 away from second idler wheel 16. Second idler wheel 16 is rotatably fixedly connected to a coupling output wheel 33. Displaceable output cone pulley 24 together with coupling output wheel 33 forms a second clutch device 34 that is designed as a claw clutch, one claw part being situated on coupling output wheel 33, and another claw part being situated on displaceable output cone pulley 24. When output cone pulley 24 is pushed in the axial direction toward second idler wheel 16, second clutch device 34 is closed in a form-locked manner and second coupling system 30 is placed in a coupled state. When output cone pulley 24 is pushed away from second idler wheel 16 in the axial direction, second coupling system 30 is transferred from the coupled state into the uncoupled state.

Gear system 1 optionally includes an auxiliary gear section that is designed as a gear stage, for example, so that input interface 3 and output interface 5 are situated coaxially with respect to one another and with respect to input shaft 10 and electric motor 4. In addition, differential unit 6 may be situated coaxially with respect to same. In this exemplary embodiment, input shaft 10 is designed as a hollow shaft, so that one of the output shafts of differential unit 6 may be passed through input shaft 10 and electric motor 4, and gear system 1 may be situated coaxially with respect to an axle of vehicle 2.

Gear system 1 functions as follows:

Gear system 1 is illustrated in a first shift state in FIG. 1. In the first shift state, first coupling system 25 is illustrated in a coupled state, displaceable input cone pulley 22 being rotatably fixedly coupled to first idler wheel 12. In contrast, second coupling system 30 is in an uncoupled state, displaceable output cone pulley 24 and second idler wheel 16 being rotatably decoupled from one another.

A torque path provided as a first torque path extends, starting from input interface 3, via input shaft 10, displaceable input cone pulley 22, coupling input wheel 28, first idler wheel 12, first intermediate wheel 14, first fixed wheel 13, and output shaft 11 to output interface 5. In the first shift state, the drive torque is thus led across first transmission gear section 7, and gear system 1 provides first fixed gear ratio i1 between input interface 3 and output interface 5.

Figure 3:
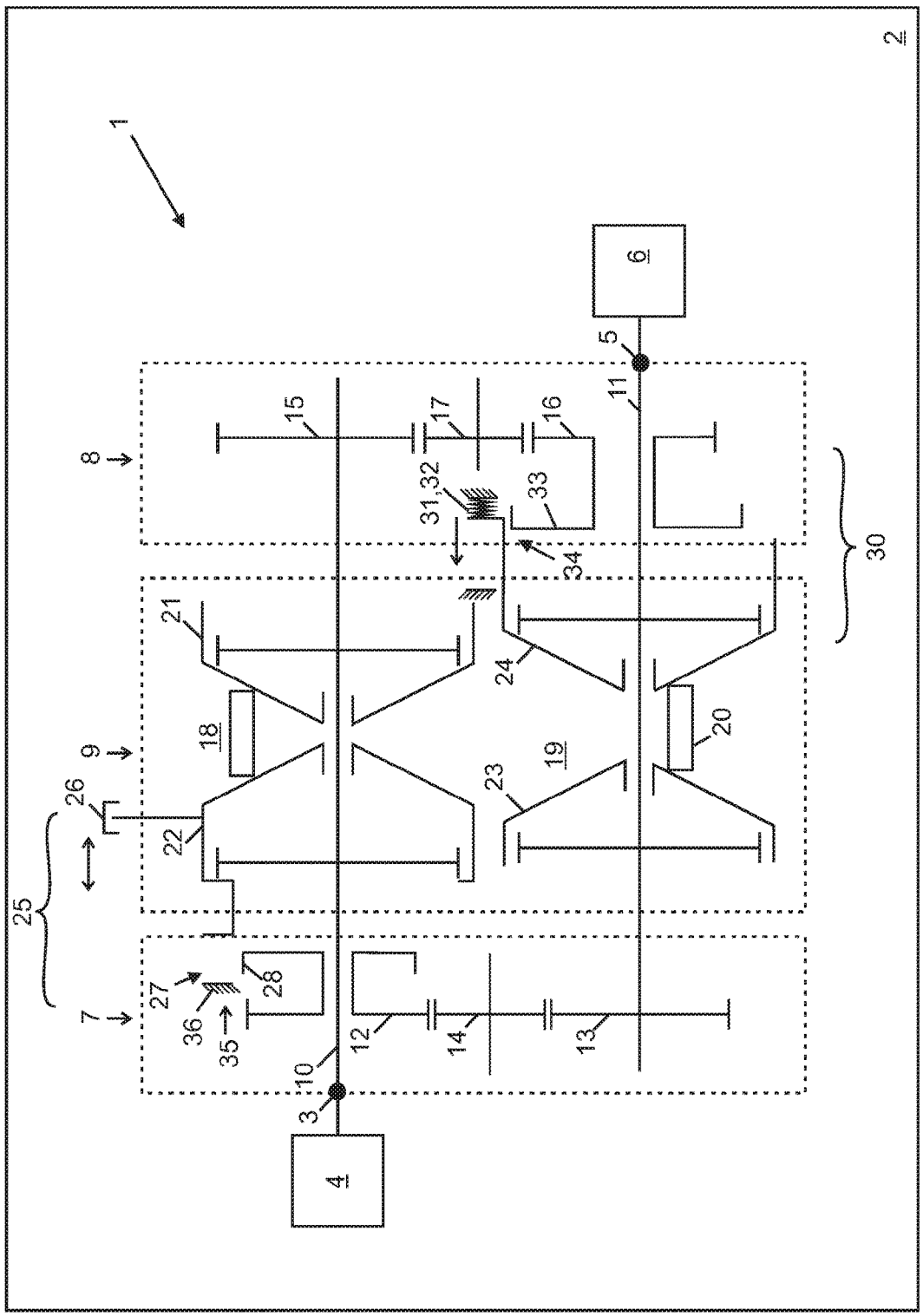
FIG. 3 shows the gear system of the preceding figures in a second shift state.

FIG. 3 illustrates gear system 1 in a second shift state. In the second shift state, first coupling system 25 is in an uncoupled state, displaceable input cone pulley 22 being decoupled from first idler wheel 12. In contrast, second coupling system 30 is in a coupled state, displaceable output cone pulley 24 and second idler wheel 16 being rotatably fixedly coupled to one another.

A torque path provided as a second torque path extends, starting from input interface 3, via input shaft 10, second fixed wheel 15, second intermediate wheel 17, second idler wheel 16, coupling output wheel 33, displaceable output cone pulley 24, and output shaft 11 to output interface 5. In the second shift state, the drive torque is thus led across second transmission gear section 8, and gear system 1 provides second fixed gear ratio i2 between input interface 3 and output interface 5.

Figure 2:
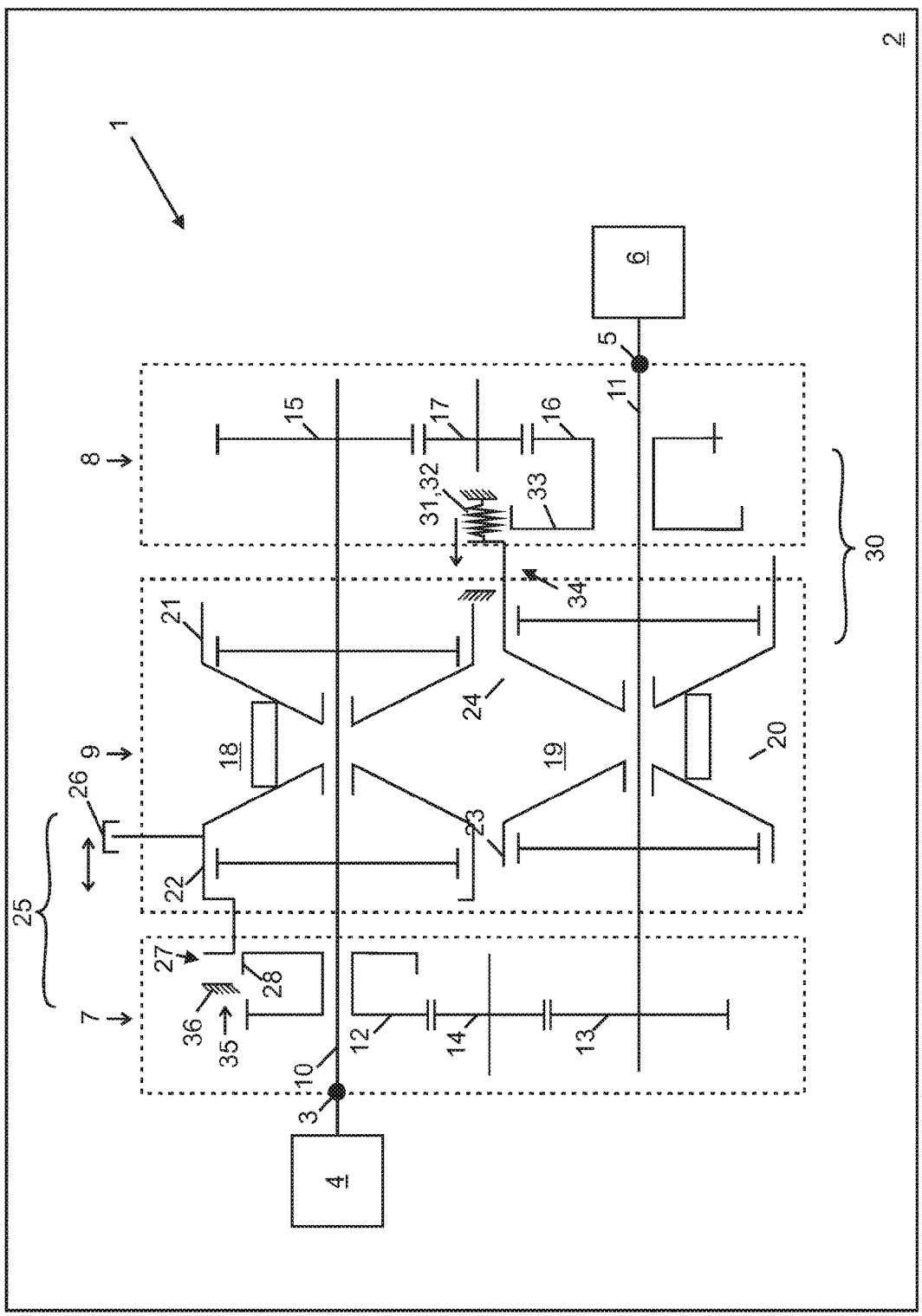
FIG. 2 shows the gear system in FIG. 1 in an intermediate shift state.

FIG. 2 shows gear system 1 in an intermediate shift state. In the intermediate shift state, first coupling system 25 is in an uncoupled state, displaceable input cone pulley 22 being decoupled from first idler wheel 12. Similarly, second coupling system 30 is in an uncoupled state, displaceable output cone pulley 24 and second idler wheel 16 being rotatably decoupled from one another.

A torque path provided as an intermediate torque path extends, starting from input interface 3, via input shaft 10, the pair of input cone pulleys 18, traction mechanism 20, the pair of output cone pulleys 19, and output shaft 11 to output interface 5. In the intermediate shift state, the drive torque is thus led across intermediate gear section 9, and gear system 1 provides the variable gear ratio of intermediate gear section 9 between input interface 3 and output interface 5.

The transition between the first shift state via the intermediate shift state into the second shift state, or in the opposite direction, is initiated by first coupling device 26. The first coupling device moves displaceable input cone pulley 22 on input shaft 10 in the axial direction, so that first coupling system 25 is transferred from the coupled state into the uncoupled state. The torque path is transferred from the first torque path into the second torque path. During the transition, the variable gear ratio is set in such a way that it corresponds to first gear ratio i1 of first transmission gear section 7. Due to axially moving displaceable input cone pulley 22, the axial distance between input cone pulleys 21, 22 is decreased, so that traction mechanism 20 is forced to increase its effective pitch diameter in the pair of input cone pulleys 18. As the result of increasing the effective pitch diameter at the pair of input cone pulleys 18, the effective pitch diameter at the pair of output cone pulleys 19 must be decreased. This results on the one hand in a change in the variable gear ratio, so that it is converted from gear ratio i1 into gear ratio i2 due to axially moving displaceable input cone pulley 22. On the other hand, this results in displaceable output cone pulley 24 being guided, against the spring action of second coupling device 31, in the direction of coupling output wheel 33 due to the increase in the axial distance from stationary output cone pulley 23. The gear ratio of intermediate gear section 9 is adapted to second fixed gear ratio i2, second coupling system 30 is then closed, and the second shift state is reached.

Downshifting from the second shift state, via the intermediate shift state, into the first shift state is implemented in that first coupling device 26 axially moves displaceable input cone pulley 22 in the direction of the first idler wheel. The axial distance between the pair of output cone pulleys 19 is thus decreased, and displaceable output cone pulley 23 may be pushed away from second idler wheel 16 or coupling output wheel 33 in the axial direction by second coupling device 31, so that second coupling system 30 is transferred from the coupled state into the uncoupled state. The gear ratio is subsequently led from i2 to i1, and lastly, first coupling system 25 is transferred from the uncoupled state to the coupled state.

Gear system 1 optionally includes a blocking device 35 that is formed by a stop 36 and displaceable input cone pulley 22. Stop 36 is fixed to the housing and/or to the frame. Displaceable input cone pulley 22 and stop 36 are designed for a frictionally locked and/or form-locked coupling. Blocking device 35 is activated or locked in that first coupling device 26 moves displaceable input cone pulley 22 from stationary input cone pulley 21 across the shift position for first transmission gear section 7 into a blocked position. Displaceable input cone pulley 22 is moved in the axial direction against stop 36, and is connected to same in a form-locked and/or frictionally locked manner around input shaft 10 in the circumferential direction. To release blocking device 35, displaceable input cone pulley 22 is moved, for example, into the shift position for first transmission gear section 7. The actuation of blocking device 35 is thus carried out by the same first coupling device 26.

Continuously variable shifting between two shift states and/or gears is thus made possible by gear system 1, the shift states and/or the gears having a fixed gear ratio. Gear system 1 thus combines the advantages of a stepped gear with the advantages of a continuously variable transmission.

LIST OF REFERENCE NUMERALS

1 gear system
2 vehicle
3 input interface
4 electric motor
5 output interface
6 differential unit
7 first transmission gear section
8 second transmission gear section
9 intermediate gear section
10 input shaft
11 output shaft
12 first idler wheel
13 first fixed wheel
14 first intermediate wheel
15 second fixed wheel
16 second idler wheel
17 second intermediate wheel
18 input cone pulley pair
19 output cone pulley pair
20 traction mechanism
21 stationary input cone pulley 22 displaceable input cone pulley
23 stationary output cone pulley
24 displaceable output cone pulley
25 first coupling system
26 first coupling device
27 first clutch device
28 coupling input wheel
30 second coupling system
31 second coupling device
32 compression spring
33 coupling output wheel
34 second clutch device
35 blocking device
36 stop
i1 first fixed gear ratio
i2 second fixed gear ratio

The invention claimed is:

1. A gear system for an electric motor of a vehicle, the gear system comprising:
an input interface for coupling to the electric motor;
an output interface, a torque path extending between the input interface and the output interface;
a first transmission gear section having a first gear ratio, in a first shift state the torque path extending across the first transmission gear section;
a second transmission gear section having a second gear ratio, in a second shift state the torque path extending across the second transmission gear section;
an intermediate gear section having a continuously variable gear ratio, in an intermediate shift state the torque path extending across the intermediate gear section; and
at least one coupling system configured for at least one of:
detachably coupling the intermediate gear section to the first transmission gear section such that torque is transferable from an input shaft through the first transmission gear section into the intermediate gear section, or
detachably coupling the intermediate gear section to the second transmission gear section such that torque is transferable from the intermediate gear section to the second transmission gear section.

2. The gear system as recited in claim 1 wherein a transition from the first shift state, via the intermediate shift state, into the second shift state, or from the second shift state, via the intermediate shift state, into the first shift state, is provided with no interruption in traction.

3. The gear system as recited in claim 1 wherein the first or the second transmission gear section is designed as a gear stage.

4. The gear system as recited in claim 1 wherein the intermediate gear section is designed as a CVT section or as a traction mechanism gear section.

5. The gear system as recited in claim 1 wherein the intermediate gear section includes a pair of input cone pulleys, a pair of output cone pulleys, and a traction mechanism, the traction mechanism being situated operatively connected between the pairs of input and output cone pulleys.

6. The gear system as recited in claim 5 wherein the at least one coupling system includes a first coupling device for displacing one of the input cone pulleys, as a displaceable input cone pulley, in at least one axial direction, and a coupling input wheel of the first transmission gear section, a coupling between the coupling input wheel and the displaceable input cone pulley taking place via an axial movement of the displaceable input cone pulley, an axial distance between the displaceable input cone pulley and the other input cone pulley being greater in a coupled state than in an uncoupled state;
or
the at least one coupling system includes a second coupling device for displacing one of the output cone pulleys, as a displaceable output cone pulley, in at least one axial direction, and a coupling output wheel of the second transmission gear section, a coupling between the displaceable output cone pulley and the coupling output wheel taking place by axially moving the displaceable output cone pulley, an other axial distance between the displaceable output cone pulley and the other output cone pulley being greater in the coupled state than in the uncoupled state.

7. The gear system as recited in claim 6 wherein the coupling input wheel and the displaceable input cone pulley in the coupled state are connected to one another in a form-locked manner about a shared rotation axis in a circumferential direction, or the coupling output wheel and the displaceable output cone pulley in the coupled state are connected to one another in a form-locked manner about a shared rotation axis in a circumferential direction.

8. The gear system as recited in claim 6 wherein the first coupling device or the second coupling device is designed as an active coupling device.

9. The gear system as recited in claim 8 wherein the second coupling device is designed as a passive coupling device.

10. The gear system as recited in claim 6 further comprising the input shaft and an output shaft, the input shaft being operatively connected to the input interface and the output shaft being operatively connected to the output interface, the first transmission gear section including a first fixed wheel on the output shaft and a first idler wheel on the input shaft, the first coupling device being designed for coupling and decoupling the displaceable input cone pulley to and from the first idler wheel as a coupling input wheel, and the second transmission gear section including a second fixed wheel on the input shaft and a second idler wheel on the output shaft, the second coupling device being designed for decoupling the displaceable output cone pulley and the second idler wheel, as a coupling output wheel.

11. The gear system as recited in claim 1 wherein the at least one coupling system includes a first coupling system configured for detachably coupling the intermediate gear section to the first transmission gear section such that torque is transferable from the input shaft through the first transmission gear section into the intermediate gear section.

12. The gear system as recited in claim 11 wherein the first coupling system includes an electrical actuator configured for axially displacing an input part of the intermediate gear section in both directions to selectively couple the first gear section directly to the intermediate gear section and to selectively decouple the first gear section from the intermediate gear section.

13. The gear system as recited in claim 1 wherein the at least one coupling system includes a second coupling system configured for detachably coupling the intermediate gear section to the second transmission gear section such that torque is transferable from the intermediate gear section to the second transmission gear section.

14. The gear system as recited in claim 13 wherein the second coupling system includes a spring configured for axially displacing a part of the intermediate gear section in both directions to selectively couple the second gear section directly to the intermediate gear section and to selectively decouple the second gear section from the intermediate gear section.

15. The gear system as recited in claim 1 wherein the at least one coupling system includes a first coupling system configured for detachably coupling the intermediate gear section to the first transmission gear section such that torque is transferable from the input shaft through the first transmission gear section into the intermediate gear section and a second coupling system configured for detachably coupling the intermediate gear section to the second transmission gear section such that torque is transferable from the intermediate gear section to the second transmission gear section.

16. A gear system for an electric motor of a vehicle, the gear system comprising:
an input interface for coupling to the electric motor;
an output interface, a torque path extending between the input interface and the output interface;
a first transmission gear section having a first gear ratio, in a first shift state the torque path extending across the first transmission gear section;
a second transmission gear section having a second gear ratio, in a second shift state the torque path extending across the second transmission gear section;
an intermediate gear section having a continuously variable gear ratio, in an intermediate shift state the torque path extending across the intermediate gear section,
wherein the intermediate gear section includes a pair of input cone pulleys, a pair of output cone pulleys, and a traction mechanism, the traction mechanism being situated operatively connected between the pairs of input and output cone pulleys,
the gear system further comprising a first coupling device for displacing one of the input cone pulleys, as a displaceable input cone pulley, in at least one axial direction, and a coupling input wheel of the first transmission gear section, a coupling between the coupling input wheel and the displaceable input cone pulley taking place via an axial movement of the displaceable input cone pulley, an axial distance between the displaceable input cone pulley and the other input cone pulley being greater in a coupled state than in an uncoupled state;
or
further comprising a second coupling device for displacing one of the output cone pulleys, as a displaceable output cone pulley, in at least one axial direction, and a coupling output wheel of the second transmission gear section, a coupling between the displaceable output cone pulley and the coupling output wheel taking place by axially moving the displaceable output cone pulley, an other axial distance between the displaceable output cone pulley and the other output cone pulley being greater in the coupled state than in the uncoupled state.

17. The gear system as recited in claim 16 wherein the coupling input wheel and the displaceable input cone pulley in the coupled state are connected to one another in a form-locked manner about a shared rotation axis in a circumferential direction, or the coupling output wheel and the displaceable output cone pulley in the coupled state are connected to one another in a form-locked manner about a shared rotation axis in a circumferential direction.

18. The gear system as recited in claim 16 wherein the first coupling device or the second coupling device is designed as an active coupling device.

19. The gear system as recited in claim 18 wherein the second coupling device is designed as a passive coupling device.

20. The gear system as recited in claim 16 further comprising an input shaft and an output shaft, the input shaft being operatively connected to the input interface and the output shaft being operatively connected to the output interface, the first transmission gear section including a first fixed wheel on the output shaft and a first idler wheel on the input shaft, the first coupling device being designed for coupling and decoupling the displaceable input cone pulley to and from the first idler wheel as a coupling input wheel, and the second transmission gear section including a second fixed wheel on the input shaft and a second idler wheel on the output shaft, the second coupling device being designed for decoupling the displaceable output cone pulley and the second idler wheel, as a coupling output wheel.

* * * * *